United States Patent [19]

Tanaka et al.

[11] Patent Number: 5,163,501
[45] Date of Patent: Nov. 17, 1992

[54] SPLIT DIES FOR CASTING SMALL SEGMENTS OF TIRE MOLD

[75] Inventors: Hideaki Tanaka; Kazuhiko Ota; Shirou Katsumata; Sachiko Kamata, all of Kodaira, Japan

[73] Assignee: Bridgestone Corporation, Tokyo, Japan

[21] Appl. No.: 760,851

[22] Filed: Sep. 18, 1991

Related U.S. Application Data

[63] Continuation of Ser. No. 482,136, Feb. 21, 1990, abandoned.

[30] Foreign Application Priority Data

Feb. 23, 1989 [JP] Japan .................................... 1-41787

[51] Int. Cl.$^5$ ............................................. B22D 17/22
[52] U.S. Cl. ...................................... 164/342; 249/160
[58] Field of Search ................... 164/339, 342, 137; 249/160

[56] References Cited

U.S. PATENT DOCUMENTS

| | | | |
|---|---|---|---|
| 2,442,516 | 6/1948 | Shriver | 164/342 |
| 2,510,841 | 12/1945 | Stowe . | |
| 4,552,522 | 11/1985 | Van Melle . | |

FOREIGN PATENT DOCUMENTS

| | | |
|---|---|---|
| 2632125 | 8/1977 | Fed. Rep. of Germany . |
| 999395 | 10/1949 | France . |
| 34537 | 12/1964 | German Democratic Rep. .................. 164/342 |
| 52-70934 | 6/1977 | Japan ..................................... 164/137 |
| 59-185560 | 10/1984 | Japan ..................................... 164/342 |
| 61-108512 | 5/1986 | Japan . |
| 62-40963 | 2/1987 | Japan ..................................... 164/342 |
| 62-55114 | 3/1987 | Japan ..................................... 164/342 |
| 1045877 | 8/1962 | United Kingdom . |
| 1107766 | 1/1965 | United Kingdom . |

*Primary Examiner*—Kuang Y. Lin
*Attorney, Agent, or Firm*—Sughrue, Mion, Zinn, Macpeak & Seas

[57] ABSTRACT

Split dies include an upper die and a lower die for casting small segments constituting tread pattern forming portions of a tire mold. The lower mold includes a telescopic die having an upper surface forming a die bottom wall having a configuration corresponding to the tread pattern forming portions of the small segments. The lower mold further includes a main die having a cavity for receiving the telescopic die and having side walls surrounding the cavity to form die inner walls whose configuration corresponds to side walls of the small segments.

3 Claims, 3 Drawing Sheets

FIG_1
PRIOR ART
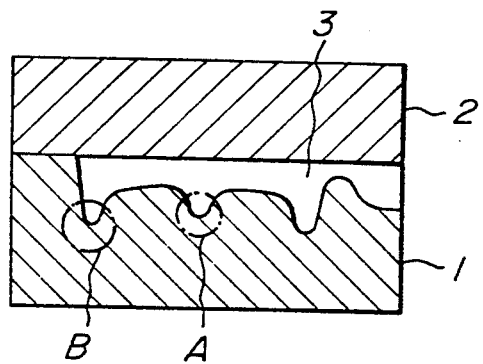
FIG_2a
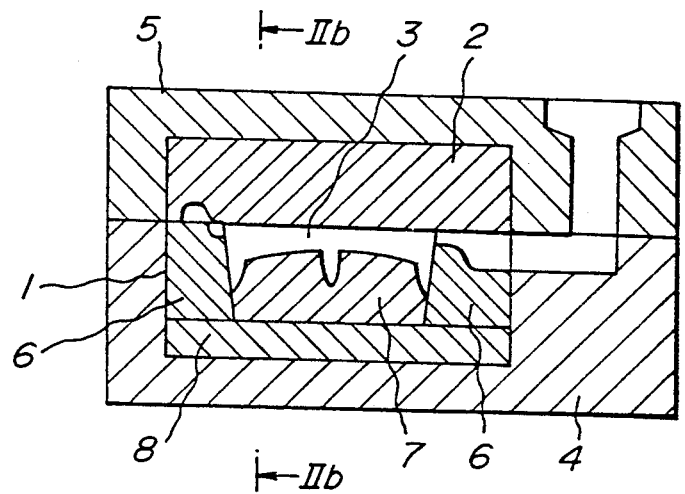
FIG_2b
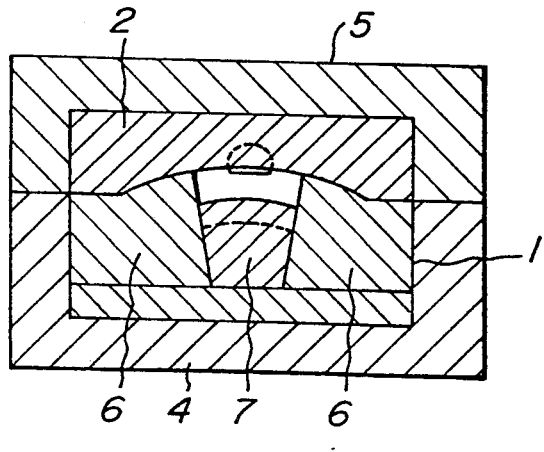

FIG_3a
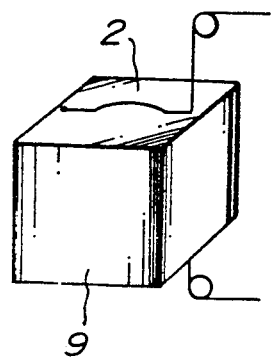
FIG_3b
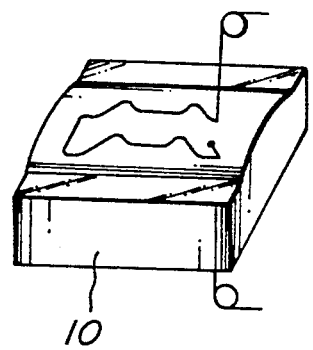
FIG_3c
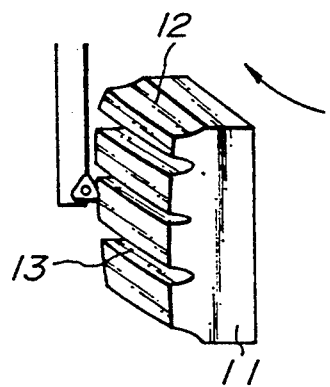
FIG_3d
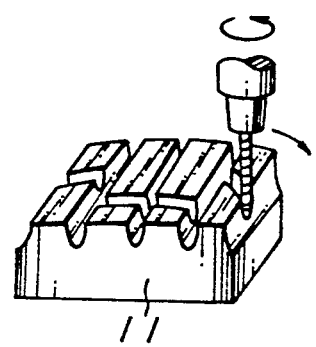
FIG_3e
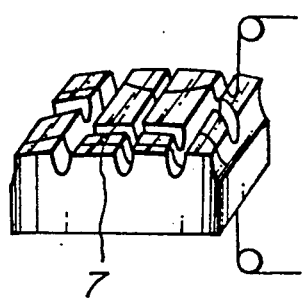
FIG_3f
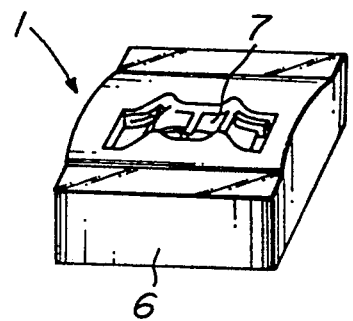

FIG_4
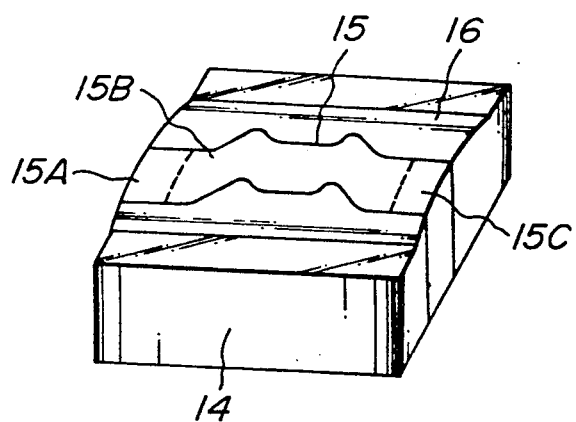

SPLIT DIES FOR CASTING SMALL SEGMENTS OF TIRE MOLD

This is a continuation of application No. 07/482,136 filed Feb. 21, 1990, now abandoned.

BACKGROUND OF THE INVENTION

This invention relates to split dies for casting small segments for constituting tread pattern forming portions of tire vulcanizing molds.

Recently, in order to improve operating efficiency and effectiveness of maintenance of tire vulcanizing molds, small pieces or small segments having shapes corresponding to tread patterns are often arranged side by side in width directions of treads and circumferential directions of tires to form tread pattern forming portions, (Japanese Patent Laid-open No. 61-108,512).

As shown in FIG. 1, dies for casting small segments consist as general dies of a lower die 1 and an upper die 2 having a cavity 3 therebetween into which a molten metal such as aluminum is poured to form small segments cast in desired shapes.

In manufacturing these dies, a bottom wall of the lower die 1 must be worked precisely to meet a tread pattern because tread pattern forming portions are formed at the bottom wall of the lower die 1. In other words, a portion of the die in a circle A in FIG. 1 corresponds to a groove of the tread, whose groove corner is particularly to be sharply formed. In the same manner, a portion of the die in a circle B corresponds to a side wall of the small segment which must be worked so as to be a sharply formed groove having a flat wall on one side forming a contact surface with a small segment in assembling. If a contact between two segments is inaccurate to provide clearances therebetween, rubber will penetrate into the clearances in vulcanization to form of fins occurring along the contacting surfaces, which would require a post-treatment similar to that in case of spews.

For producing such dies, the electrical discharge is generally used with electrodes identical in shape with tread pattern forming portions of the dies or separate electrodes for working portions corresponding to grooves and tread surfaces. Therefore, many processes are required for working the electrodes to obtain precise dimensions thereof. In addition, the requirement in manufacturing dies such as sharp working of groove corners above described could not be fulfilled.

With the portion B of the dies shown in FIG. 1, moreover, there is a problem of gas venting to be insufficient in casting so that side walls of small segments could not be sharply formed. As a result, contact between the small segments themselves is often inaccurate.

SUMMARY OF THE INVENTION

It is an object of the invention to provide an improved dies construction which fulfills all the requirements for dies for casting small segments of tire molds.

In order to accomplish the object, in split dies including upper and lower dies for casting small segments constituting tread pattern forming portions of a tire mold, according to the invention the lower mold comprises a telescopic die having an upper surface forming a die bottom wall having a configuration corresponding to the tread pattern forming portions of the small segments, and a main die having a cavity for receiving the telescopic die and having side walls surrounding said cavity to form die inner walls whose configuration corresponds to side walls of the small segments.

With the above arrangement of the invention, the lower die consists of the telescopic die and the main die so that these dies can be separately worked for manufacture. Particularly, since the telescopic die forms a die bottom wall for casting tread pattern forming portions of small segments, complicated working is generally needed. However, as the die bottom surface is located on an upper surface of the telescopic die and side walls belong to the main die, which would otherwise obstruct the working of the die bottom surface when the side walls belonged to the telescopic die, all the working is considerably easy and simple. Therefore, the working of the dies is effected sufficiently by milling or turning.

When molten metal is poured into the lower die formed by a combination of the telescopic and main dies, gas venting is effected through contacting surfaces between the telescopic and main dies, so that the molten metal can be sufficiently led to extreme ends of grooves. Therefore, sharp corners can be accomplished projections of small segments.

If widths of the contacting surfaces of both the dies serving the gas venting are too wide, there is a tendency of fins of a metal therebetween to occur. On the other hand, in the event that the width is too narrow, the gas venting therethrough is insufficient. Accordingly, the widths are required to be adjusted according to materials to be cast and casting conditions.

The invention will be more fully understood by referring to the following detailed specification and claims taken in connection with the appended drawings.

BRIEF DESCRIPTION OF THE DRAWINGS

FIG. 1 is a sectional view illustrating dies of the prior art;

FIG. 2a is a sectional view illustrating split dies according to the invention;

FIG. 2b is a sectional view taken along the line IIb—IIb in FIG. 2a;

FIGS. 3a-3f are schematic views for explaining processes of producing the split dies according to the invention; and FIG. 4 is a schematic perspective view illustrating another process for producing the split dies according to the invention.

DETAILED EXPLANATION OF THE PREFERRED EMBODIMENTS

FIGS. 2a and 2b illustrate a preferable example of split dies for die casting small segments of tire molds according to the invention;

The dies comprise a movable die 4 incorporating therein a lower die 1 and a stationary die 5 incorporating therein an upper die 2. As an alternative, the movable die 4 may incorporate therein an upper die 2 and the stationary die 5 may corporate therein a lower die 1, respectively, dependent upon a removing system of the respective dies.

Moreover, the lower die 1 is formed by a main die 6 and a telescopic die 7, both of which are bolted to a supplementary plate 8. In case that the telescopic die 7 is directly fixed to the main die 6, the supplementary plate 8 is not needed.

The main die 6 forms a frame of the lower die 1 and has inner walls identical in shape with side walls of small segments. The side walls of the small segments have configurations enabling the small segments to be engaged with each other in a snugly fitted relationship as the jigsaw puzzle.

The telescopic die 7 is formed to have a surface configuration identical (but slightly larger by shrinkage in casting in similar figure) with that of a tread pattern of the tire. Side surfaces of the telescopic die 7 correspond to inner walls of the main die 6 so that the telescopic die 7 can be fitted in the main die 6 without any clearances.

A surface of the upper die 2 on the side of cavity 3 has a curvature which is a curvature of back surfaces of small segments or inner surfaces of a holder of a vulcanizing mold for fixing the small segments plus an amount of shrinkage in casting.

A method of producing the lower and upper dies 1 and 2 will be explained by referring to FIGS. 3a–3f hereinafter.

As shown in FIG. 3a, a die blank material 9 is first cut by wire cut electrical discharging along a curve to be given to the upper die 2 into two parts, one for the upper die 2 and the other being a blank 10 for the main die 6 of the lower die 1.

The blank 10 for the main die 6 is then cut at its center by wire cut electrical discharging as shown in FIG. 3b into a configuration corresponding to side walls of small segments plus shrinkage amount in casting, whereby the main die 6 is completed by removal of the center from the blank 10.

In order to produce the telescopic die 7 of the lower die 1, as shown in FIG. 3c a separately prepared blank 11 for the telescopic die 7 is worked by a lathe to form contours 12 and grooves 13. This process may be effected by milling if required.

As shown in FIG. 3d, the blank 11 is further formed with grooves by milling, which are unable to be formed by the lathe, to complete the portion which is a die bottom wall for forming the tread pattern.

The blank 11 of the telescopic die 7 subjected to the above processes is then cut with its circumference by the wire cut electrical discharging so as to be fitted within the inner walls of the main die 6 to obtain the final telescopic die 7.

Finally, the telescopic die 7 is arranged in the main die 6 to complete the lower die 1 as shown in FIG. 3f. It is preferable that clearances between the main die 6 and the telescopic die 7 are less than 0.02 mm in order to avoid fins occurring between these dies 6 and 7.

The remaining portion of the blank 10 for the main die 6 may be used for the blank 11 of the telescopic die 7.

In working the blank 10 of the main die 6, a blank 10 for the main die 6 is first divided into three blanks 14, 15 and 16 and the blank 15 is then divided into three blanks 15A, 15B and 15C as shown in FIG. 4. Thereafter, the blank 14, 16, 15A and 15C are combined to form a main die 6, while the blank 15B is used as a blank 11 of the telescopic die 7. The main die 6 need not be a unitary body as shown in FIGS. 2a and 2b, the main die 6 may be separable die in this manner.

Costs and times were compared, which were required for manufacturing split dies for casting small segments according to the invention as above described and dies by electrical discharging with electrodes of the prior art. The costs and times for producing the split dies according to the invention were approximately one half of those according to the prior art.

Moreover, small segments were cast by the use of the dies according to the invention and the prior art. Average radii of curvatures at ends of projections (in the circle of A in FIG. 1) and side wall edges (in the circle of B in FIG. 1) were 0.03 mm with the dies according to the invention, whereas those with the dies of the prior art were 0.12 mm. The sharp edges were clearly accomplished according to the invention.

As can be seen from the above description, with the split dies according to the invention the main die and the telescopic dies constituting the lower dies can be individually treated or handled so that grooves and the like can be precisely worked and gas venting is possible through contacting surfaces between the main and telescopic dies in casting. Therefore, corners at edges of respective small segments produced by the split dies according to the invention can be sharply formed. In addition, no rubber enters between contacting surfaces of such small segments incorporated in a vulcanizing mold, so that tires devoid of fins can be produced according to the invention.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A split die comprising; upper and lower dies having a conformal parting surface formed from one die blank cut into two portions, said split die being adapted for casting small segments constituting tread pattern forming portions of a tire mold having a holder for fixing said small segments, said lower die comprises a telescopic die having an upper surface forming a die bottom wall having a configuration corresponding to the tread pattern forming portions of the small segments, and a main die having a cavity for receiving said telescopic die and having side walls surrounding said cavity to form die inner walls whose configuration corresponds to side walls of the small segments, and a surface of the upper die on the side of the cavity which corresponds to said conformal parting surface has a curvature that is a curvature of a back surface of the small segment and the same curvature as an inner surface of the holder of the tire mold for fixing the small segments.

2. Split dies as set forth in claim 1, wherein side walls of the telescopic die correspond in configuration to the inner walls of the main die such that clearances between side walls of the main die and said telescopic die are less than 0.02 mm.

3. Split dies as set forth in claim 1, wherein the main die and the telescopic die are fixed to a supplementary plate.

* * * * *